May 19, 1925.  
B. S. WARD  
1,538,765  
DIRIGIBLE HEADLIGHT  
Filed June 4, 1924  2 Sheets-Sheet 2
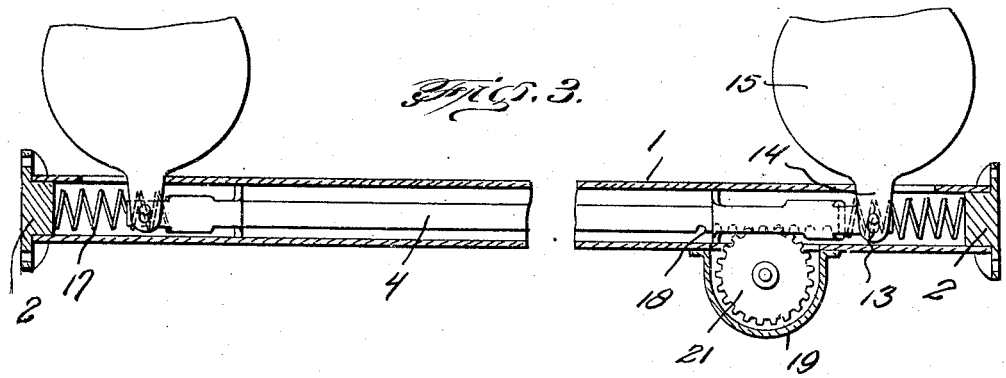
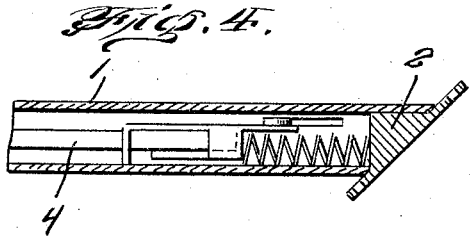
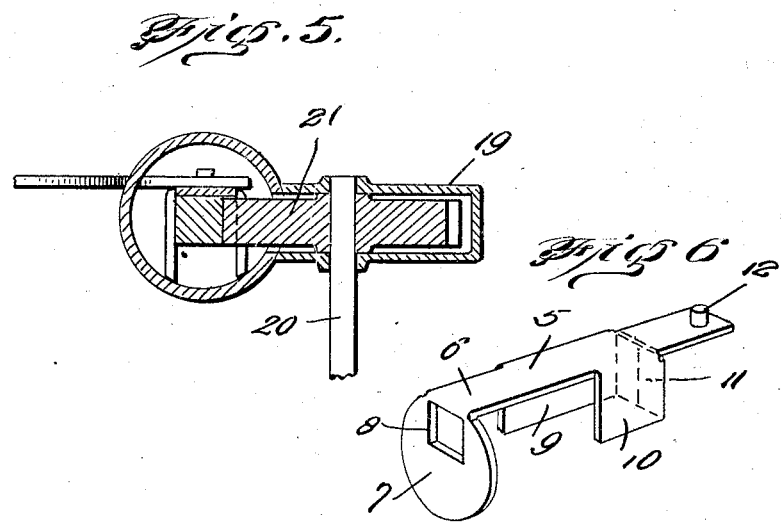
Inventor  
*Burfoot S. Ward.*
By *Glenn A. O'Brien*  
Attorney Patented May 19, 1925.

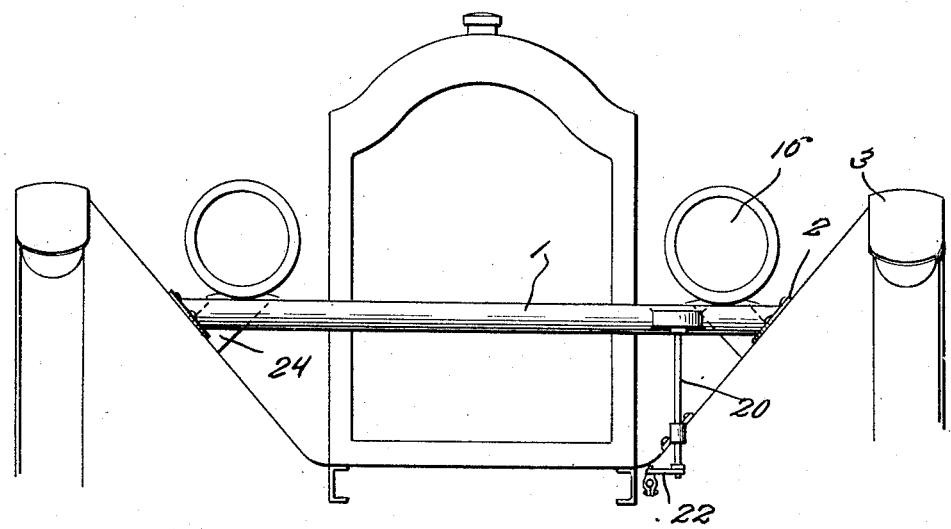
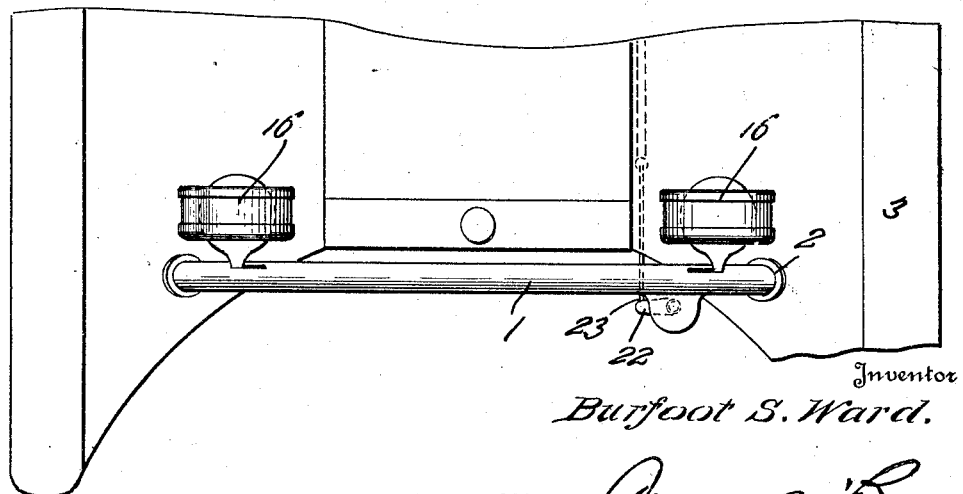

1,538,765

UNITED STATES PATENT OFFICE.

BURFOOT S. WARD, OF CAPE CHARLES, VIRGINIA.

DIRIGIBLE HEADLIGHT.

Application filed June 4, 1924. Serial No. 717,765.

*To all whom it may concern:*

Be it known that I, BURFOOT STARKEY WARD, a citizen of the United States, residing at Cape Charles, in the county of Northampton and State of Virginia, have invented certain new and useful Improvements in a Dirigible Headlight, of which the following is a specification.

This invention relates to dirigible headlight structures especially adapted to be used on automobile machines and it consists in the novel features hereinafter described and claimed.

An object of the invention is to provide a structure of the character stated which is simple and durable and which will efficiently and effectually swing or turn the headlight lamp in order that the road way may be illuminated in advance of the dirigible wheels of the automobile machine.

In the accompanying drawings:—

Figure 1 is a fragmentary front elevation of an automobile machine with the dirigible headlight structure applied.

Figure 2 is a top plan view of the same.

Figure 3 is a horizontal sectional view of the dirigible headlight structure.

Figure 4 is a fragmentary vertical sectional view thereof.

Figure 5 is a fragmentary transverse sectional view thereof.

Figure 6 is a perspective view of a sleeve member used in the dirigible headlight structure.

As illustrated in the accompanying drawings the dirigible headlight structure includes a tube 1 which is closed at its ends by means of cleats 2. The said cleats are adapted to be applied to the inner surfaces of fenders 3 of the automobile machine and the rod bridges the space between the fenders and is disposed transversely across the radiator of the machine and in advance thereof. A bar 4 is slidably mounted within the tube 1 and carries at its ends sleeves 5, the said sleeves being formed from sheet metal. As the sleeves are both alike, the description of one will suffice. Each sleeve comprising a body portion 6 having at one end a circular portion 7 provided with a rectangular opening 8 which receives the end portion of the bar 4. The sleeve is provided at its sides with depending flanges 9 and 10, the flange 9 being longer than the flange 10. The ends of the flanges 9 and 10 are inwardly disposed as at 11 and bridge the space between the said flanges. The sleeve is further provided with an upstanding lug 12 which engages through a slot 13 provided in an arm 14 which is a portion of the base 15 of the headlight lamps 16. Springs 17 are interposed between the cleats 2 and the inturned end portions 11 of the flanges 9 and 10 and the ends of the bar 4 bear against the said portions 11 of the said flanges. Thus the springs 17 serve to hold the bar 14 within the tube 1 and its ends spaced from the cleats 2. The bar 4 is provided at one side with a series of teeth 18. The casing 19 is mounted at one side of the tube 1 and a shaft 20 is journaled in the said casing. The shaft 20 carries a gear wheel 21, the teeth of which mesh with the teeth 18 of the bar 4. The shaft 20 is provided at its lower end with a crank arm 22 which is operatively connected by means of a rod 3 to the steering arm of the steering apparatus of the automobile machine (not shown). The lamp bases 15 are pivotally mounted upon brackets 24 which are attached to the sides of the fenders 3 as best shown in Figure 1 of the drawing.

When the rod 23 is moved longitudinally, the crank arm 22 is swung about the axis of the shaft 20 whereby the said shaft is turned and the wheel 21 is turned with the said shaft whereby the bar 4 is moved longitudinally within the tube 1. Thus the bases 15 of the lamps are turned at the same time that the bar 4 is moved longitudinally and one or the other of the springs 17 is compressed and at the same time that spring which is not compressed is permitted to expand so that resilient buffers are interposed between the opposite ends of the bars 4 and the cleats 2.

From the above description taken in conjunction with the accompanying drawing it will be seen that a headlight structure of simple and durable form is provided and that the parts are compactly assembled and may be easily and quickly operated or manipulated to cause the headlights to turn in the direction in which the machine is about to make a turn.

Having thus described the invention, what I claim is:—

1. A dirigible headlight structure comprising a tube, cleats closing the ends of the tube and adapted to be applied to the fenders of an automobile machine, a bar movably mounted in the tube, said bar being provided at its side with a series of teeth, sleeves disposed over the end portions of the bar and having circular portions which bear upon the inner surface of the tube, the sleeves having flanges which are disposed along the sides of the bar and around the ends thereof, springs interposed between the cleats and the flanges of the sleeve, means for moving the bar, and lamps pivotally mounted and having arms which engage the sleeves.

2. A dirigible headlight structure for an automobile machine comprising a tube, means for securing the tube to the fender of the automobile machine, a bar movably mounted in the tube, sleeves mounted upon the ends of the bar, springs interposed between the fenders and the sleeve, means operatively connecting the sleeves with the headlights, the bar being provided with gear teeth, a shaft journaled adjacent the tubes, a gear wheel carried by the shaft and meshing with the teeth of the bar and means for operatively connecting the shaft with the steering apparatus of the automobile machine.

In testimony whereof I affix my signature.

BURFOOT S. WARD.